(12) United States Patent
Frei et al.

(10) Patent No.: US 7,688,739 B2
(45) Date of Patent: Mar. 30, 2010

(54) METHOD AND APPARATUS FOR MAXIMIZING DATA TRANSMISSION CAPACITY OF A MESH NETWORK

(75) Inventors: Randall Wayne Frei, San Jose, CA (US); Linker Cheng, San Jose, CA (US); Paul Gordon, Santa Clara, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 805 days.

(21) Appl. No.: 11/372,953

(22) Filed: Mar. 10, 2006

(65) Prior Publication Data

US 2007/0030811 A1 Feb. 8, 2007

Related U.S. Application Data

(60) Provisional application No. 60/704,700, filed on Aug. 2, 2005.

(51) Int. Cl.
*H04J 1/16* (2006.01)
(52) U.S. Cl. .................................................. 370/238
(58) Field of Classification Search ................. 370/238
See application file for complete search history.

(56) References Cited

U.S. PATENT DOCUMENTS

| | | | |
|---|---|---|---|
| 4,999,829 A | 3/1991 | Fite, Jr. et al. | |
| 5,138,615 A | 8/1992 | Lamport et al. | |
| 5,491,690 A * | 2/1996 | Alfonsi et al. | 370/404 |
| 5,581,543 A | 12/1996 | Natarajan | |
| 5,606,669 A | 2/1997 | Bertin et al. | |
| 5,832,195 A | 11/1998 | Braun et al. | |
| 5,918,017 A | 6/1999 | Attanasio et al. | |
| 5,920,566 A | 7/1999 | Hendel et al. | |
| 5,928,326 A | 7/1999 | Boudou et al. | |
| 5,933,422 A | 8/1999 | Kusano et al. | |
| 5,941,955 A | 8/1999 | Wilby et al. | |
| 6,088,336 A | 7/2000 | Tosey | |
| 6,185,618 B1 | 2/2001 | Brabson | |
| 6,317,438 B1 | 11/2001 | Trebes, Jr. | |
| 6,343,067 B1 | 1/2002 | Drottar et al. | |
| 6,377,551 B1 | 4/2002 | Luo et al. | |
| 6,415,280 B1 | 7/2002 | Farber et al. | |
| 6,434,638 B1 | 8/2002 | Deshpande | |
| 6,553,031 B1 | 4/2003 | Nakamura et al. | |
| 6,584,075 B1 * | 6/2003 | Gupta et al. | 370/256 |

(Continued)

OTHER PUBLICATIONS

E. Crawley et al, A framework for QoS-Based Routing in the Internet, Aug. 1998, The internet society.*

(Continued)

*Primary Examiner*—Pankaj Kumar
*Assistant Examiner*—Gautam Sharma
(74) *Attorney, Agent, or Firm*—Moser IP Law Group

(57) ABSTRACT

A mesh network routing protocol for optimizing network data transmission capacity using a cost analysis based upon a links proximity to the gateway or other bandwidth constrained node. Specifically, the protocol computes a plurality of routing costs associated with each data path, compares the routing costs, and then selects the data path associated with the lowest routing cost for the transmission of data. Each link in each of the paths is weighted in view of its proximity to an ingress/egress point to the mesh network or other bandwidth constrained node or link of the network.

20 Claims, 5 Drawing Sheets

ROUTING EXAMPLE

U.S. PATENT DOCUMENTS

| | | | |
|---|---|---|---|
| 6,628,643 | B1 | 9/2003 | Park et al. |
| 6,667,957 | B1 | 12/2003 | Corson et al. |
| 6,839,769 | B2 | 1/2005 | Needham et al. |
| 6,857,026 | B1 | 2/2005 | Cain |
| 6,871,235 | B1 | 3/2005 | Cain |
| 7,203,743 | B2 | 4/2007 | Shah-Heydari |
| 2002/0143855 | A1 | 10/2002 | Traversat et al. |
| 2002/0147815 | A1 | 10/2002 | Tormasov et al. |
| 2002/0184311 | A1 | 12/2002 | Traversat et al. |
| 2004/0044727 | A1 | 3/2004 | Abdelaziz et al. |
| 2004/0196787 | A1* | 10/2004 | Wang et al. .............. 370/229 |
| 2004/0205239 | A1 | 10/2004 | Doshi et al. |

OTHER PUBLICATIONS

Paolo Narvaez et al, Local Restoratio Algorithm for Link-State Routing Protocols, Oct. 1998, IEEE, computer communications and networks 1999, proceedings eight international conference.*

Yigal Bejerano et al, Algorithm for Computing QoS Paths With restoration, Jun. 2005,IEEE/ACM Transactions on Networking, vol. 13, No. 3.*

Routing Basics, The internetworking Technology Handbook, Jun. 1999, Cisco.com.*

Narvaez et al, Local Restoration Algorithm for Link-State Routing Protocol, computer communications and networks, 1999, proceedings, 8th international conference, IEEE, p. 352-357.*

Crawley et al, A Framework for QoS-based Routing in the Internet, The Internet Society, 1998.*

Internetworking Technology Handbook, Cisco.com, Jun. 1999.*

Bamatraf, M.; Othman, M.; Johari, R.; Subramaniam, S.; "Optimizing Paths in OSPF Routing", *Networks*, 2005. Jointly held with the 2005 IEEE 7th Malaysia International Conference on Communication, 2005 13th IEEE International Conference on, vol. 1, Nov. 16-18, 2005, pp. 602-606.

Rowstron, Antony, et al., "Pastry: Scalable, decentralized object location and routing for large-scale peer-to-peer systems." In Proc. IFIP/ACM Middleware 2001, Heidelberg, Germany, Nov. 2001.

Zhao, Ben Y., et al. "Tapestry: An Infrastructure for Fault-tolerant Wide-area Location and Routing," UCB Tech. Report UCB/CSD-01-1141. Apr. 2001.

Stoica, Ion, et al., "Chord: A Scalable Peer-to-peer Lookup Service for Internet Applications," ACM SIGCOMM 2001, San Diego, CA, Aug. 27-31, 2001, pp. 149-160.

Manku, Gurmeet Singh, et al., "Symphony: Distributed Hashing in a Small World," Published in USITS, 2003.

Kubiatowicz, John, et al., "OceanStore: An Architecture for Global-Scale Persistent Storage," Proceedings of ACM ASPLOS, Nov. 12-15, 2000.

Adya, Atul, et al., "FARSITE: Federated, Available, and Reliable Storage for an Incompletely Trusted Environment," Proceedings for the 5th OSDI Symposium, Boston, MA, Dec. 2002.

Garces-Erice, L., et al., "Hierarchical Peer-to-Peer- Systems," in the Special issue of the Parallel Processing Letters (PPL), Dec. 2003, vol. 3, No. 4.

Iwao, Tadashige, et al., "Large Scale Peer-to-Peer Experiments with Virtual Private Community (VPC) Framework," CIA 2002, LNAI 2446, pp. 66-81, 2002.

Ng, Wee Siong, et al., "BestPeer: A Self-Configurable Peer-to-Peer System," Department of Computer Science, National University of Singapore, pp. 1-21.

Traversat, Bernard, et al., "Project JXTA Virtual Network," Sun Microsystems, Inc., Feb. 5, 2002.

* cited by examiner

METHOD AND APPARATUS FOR MAXIMIZING DATA TRANSMISSION CAPACITY OF A MESH NETWORK

CROSS-REFERENCE TO RELATED APPLICATIONS

This application claims benefit of U.S. provisional patent application Ser. No. 60/704,700, filed Aug. 2, 2005, which is herein incorporated by reference.

BACKGROUND OF THE INVENTION

1. Field of the Invention

Embodiments of the present invention generally relate to mesh networks and, more particularly, to a method and apparatus for maximizing data transmission network capacity of a mesh network.

2. Description of the Related Art

Communication systems used to deliver broadband data are traditionally organized in a hub and spoke arrangement. However, such arrangements can result in bottlenecks when traffic to certain network nodes exceeds a spoke's data transmission capacity. Since each node is connected to the hub by a single path, the path limits the data transmission capacity to the node.

A mesh network allows nodes or access points to communicate directly with other nodes without being routed through a central switch point, e.g., a hub. Nodes act as repeaters to transmit data from nearby nodes to peers that are too far away to reach, resulting in a network that can span a large distance. Mesh networks also have the capability of self healing, as each node is often connected to several other nodes. If one node fails or is removed from the network, traffic can be rerouted through other interconnected nodes. Thus, a mesh network is highly scalable. In contrast, traditional networks require the installation of expensive hubs and cables between a network gateway and any node. Very often, the delivery of a broadband network connection to the last mile can be cost prohibitive. A mesh network is more flexible, and has a lower cost of installation.

More specifically, mesh architectures typically comprise multiple interconnected infrastructure nodes. These mesh nodes may be connected by wires or, more typically, connected wirelessly. One or more of these infrastructure nodes provides connectivity from the mesh network to a wired or wireless backhaul to a Wide Area Network (WAN) such as the Internet. The infrastructure nodes that provide access to the WAN are known as mesh gateways.

Data packets generated by a node located within a mesh network are routed over the mesh network to a mesh gateway. Conversely, data packets received from the WAN are routed from the mesh gateway to a node. To traverse the network, data packets are routed from one node to another through a particular path. The currently accepted method of choosing a path through the network is to select the path associated with the least number of hops between the gateway and a node. However, depending upon data traffic on the network at any given time, the least number of hops may not result in the highest data transmission capacity.

Therefore, there is a need in the art for a method and apparatus for maximizing data capacity transmission in a mesh network.

SUMMARY OF THE INVENTION

The present invention is a mesh network routing protocol for optimizing network data transmission capacity using a cost analysis based upon a links proximity to the gateway or other bandwidth constrained node. Specifically, the protocol computes a plurality of routing costs associated with each data path, compares the routing costs, and then selects the data path associated with the lowest routing cost for the transmission of data. Each link in each of the paths is weighted in view of its proximity to an ingress/egress point to the mesh network or other bandwidth constrained node or link of the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
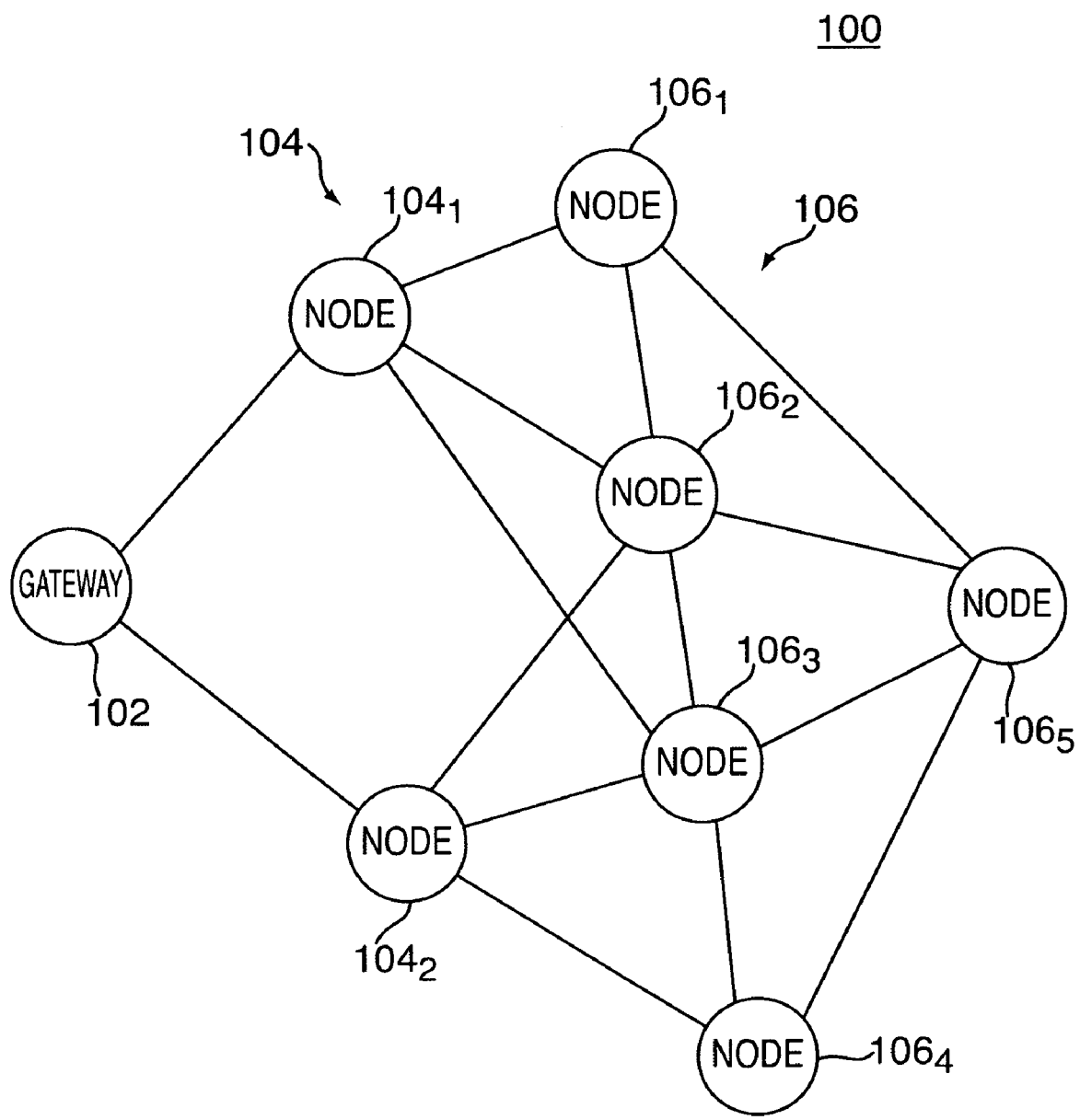
FIG. 1 is a graphical view of a mesh network.

FIG. 1 is a graphical depiction of one embodiment of a mesh network 100 comprising a gateway 102 connected nodes 104 and nodes 106. The nodes 104/106 are interconnected to each other such that multiple paths exist between each node 104/106 and the gateway 102.

Specifically, a mesh gateway 102 is connected to a first pair of nodes $104_1$ and $104_2$ (collectively nodes 104). The nodes 104 aggregate data streams from many nodes 106 into a high speed link to the gateway 102. In the example, nodes $104_1$ and $104_2$ are each connected to a plurality of nodes 106. Specifically, node $104_1$ is connected to node $106_1$, $106_2$, $106_3$ and node $104_2$ is connected to node $106_2$, $106_3$, and $106_4$. The nodes $104_1$ and $104_2$ are also connected to one another. The nodes 106 are interconnected to one another and connected to node $106_5$. Data traffic is routed on downstream paths from the gateway 102 to the nodes 106 where the data is utilized, e.g., nodes 106 may be modems that supply connectivity to Internet data for a computer. The nodes 106 send data on upstream paths to the gateway 102. One such mesh network is described in U.S. patent application Ser. No. 10/122,883, filed Apr. 15, 2002 and U.S. patent application Ser. No. 10/122,886, filed Apr. 15, 2002, both of which are incorporated herein by reference.

In such mesh networks, all the traffic from the nodes 104/106 flows through an ingress/egress point of the network, e.g., a gateway 102, to/from a backbone (not shown). The path between a node and the gateway must be selected to optimize the bandwidth utilization of the network and limit creating "bottlenecks" at the nodes 104/106 or gateway 102.

To facilitate path selection, the gateway 102 generates routing cost messages and transmits the messages through the network. For each link, both upstream and downstream link capacity is collected. The cost message accumulates the link capacity of each link through which the message passes. The link capacities are weighted based upon their proximity to a bandwidth constrained node or link, e.g., a gateway. The cost message represents a cost value for a path through the network that is used to determine an optimal path, as discussed in detail below.

Figure 2:
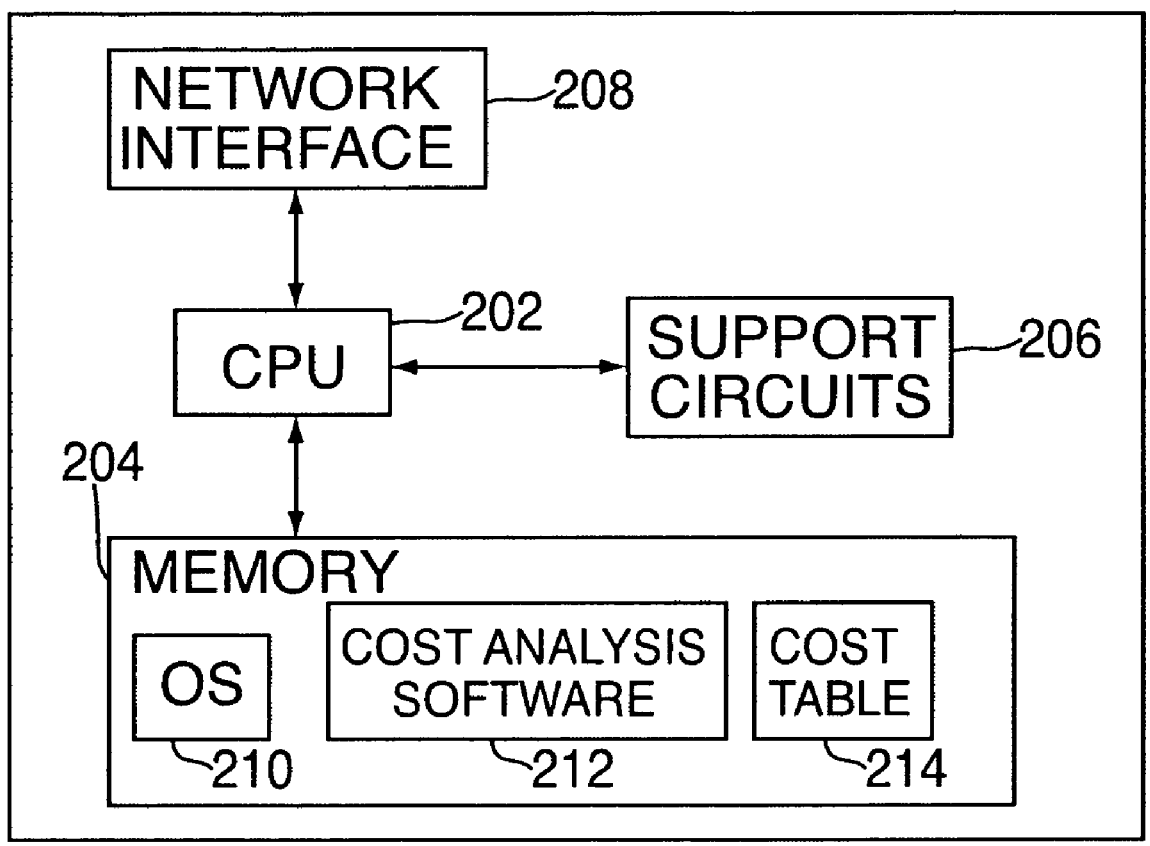
FIG. 2 is a block diagram of a node.

FIG. 2 is a block diagram of a node 106. The node comprises a CPU 202, support circuits 206, memory 204 and a network interface 208. The CPU 202 may comprise one or more readily available microprocessors or microcontrollers. The support circuits 206 are well known circuits that are used to support the operation of the CPU and may comprise one or more of cache, power supplies, input/output circuits, network interface cards, clock circuits, and the like. Memory 204 may comprise random access memory, read only memory, removable disk memory, flash memory, optical memory or various combinations of these types of memory. The memory 204 is sometimes referred to as main memory and may, in part, be used as cache memory or buffer memory. The memory 204 stores various forms of software and files, such as, an operating system (OS) 210, the cost analysis software 212, and a cost table 214. The cost table 214 comprises the information that is supplied to a cost message as a message is received by the node. This information comprises link identifiers and a cost value associated with each link that is used to communicate with the node. A series of links forms a path. The information associated with a particular link from which a cost message is received is extracted from the table 214 and added to the cost message. The network interface 208 connects the node 106 to the mesh network 100. The network interface 208 may be wired or wireless.

Figure 3:
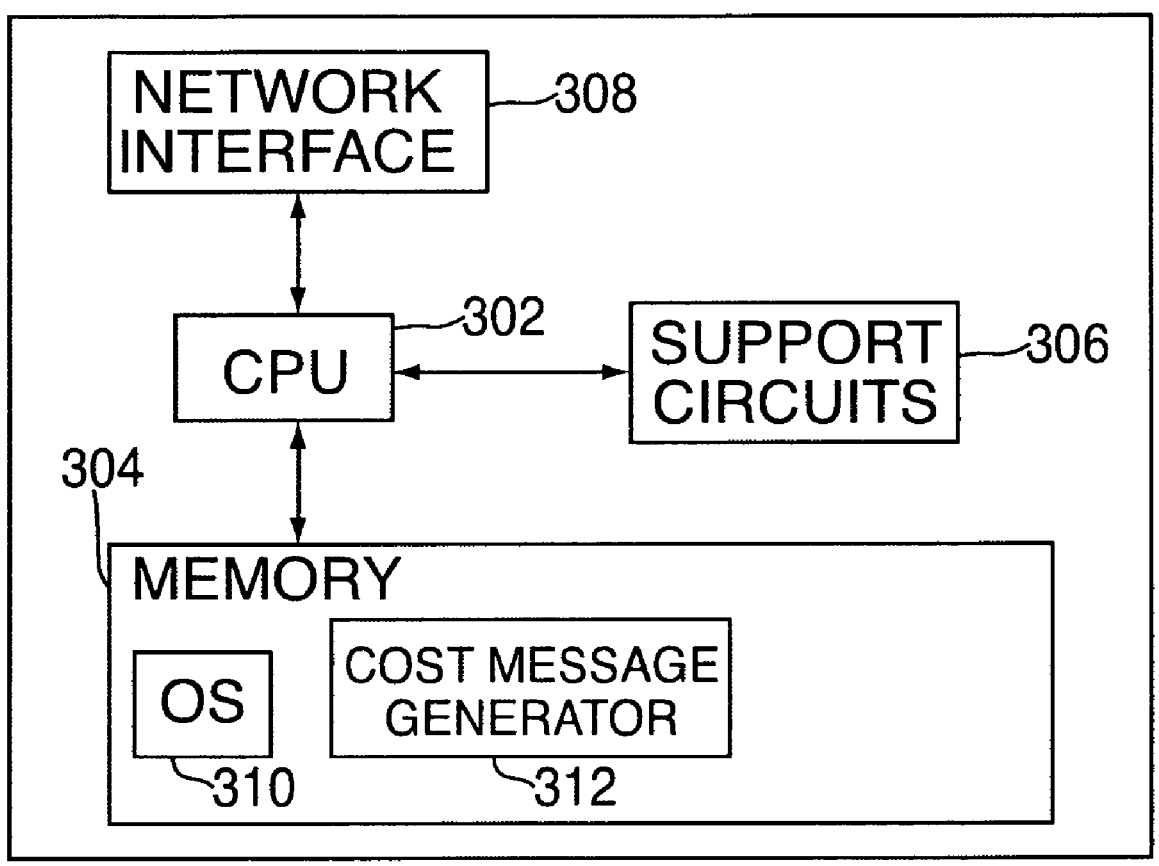
FIG. 3 is a block diagram of a gateway.

FIG. 3 is a block diagram of a gateway 102. The gateway 102 comprises a CPU 302, support circuits 306, memory 304 and a network interface 308. The CPU 302 may comprise one or more readily available microprocessors or microcontrollers. The support circuits 306 are well known circuits that are used to support the operation of the CPU 302 and may comprise one or more of cache, power supplies, input/output circuits, network interface cards, clock circuits, and the like. Memory 304 may comprise random access memory, read only memory, removable disk memory, flash memory, optical memory or various combinations of these types of memory. The memory 304 is sometimes referred to as main memory and may, in part, be used as cache memory or buffer memory. The memory 304 stores various forms of software and files, such as, an operating system (OS) 310, and a cost message generator 312. The network interface 308 connects the gateway to the mesh network 100. The network interface 308 may be wired or wireless.

Figure 4:
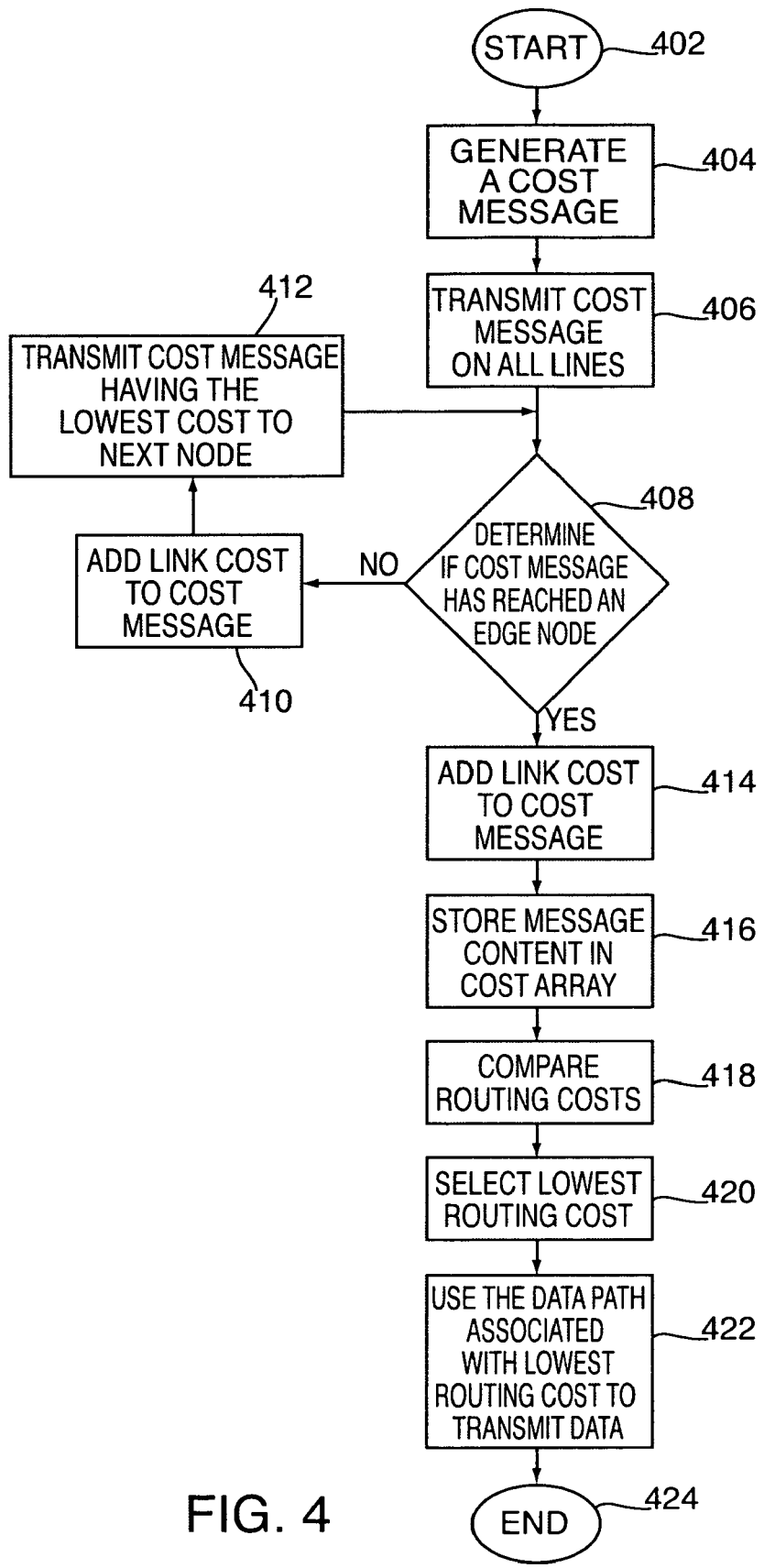
FIG. 4 is a flowchart detailing a method of implementing the cost-based algorithm of one embodiment of the present invention.

FIG. 4 depicts a flow chart of a method 400 of operation of the present invention. The method 400 begins at step 402 and proceeds to step 404 wherein the gateway 102 generates a cost message. At step 406, the cost message is transmitted from the mesh gateway on all links connected to the gateway.

At step 408, the method 400 queries whether the present node is an edge node. An edge node has only a single link connecting it to the network. The protocol for forwarding cost messages is:

(1) A cost message is never forwarded through the link from which the message was received.
(2) A node forwards the cost message containing the lowest cost value on all links, except the link from which the message was received; all other cost messages containing higher cost values are discarded.

If the query at step 408 is negatively answered, the method proceeds to step 410 where the link cost of the link used to couple to the node is added to the cost message. At step 412, the cost message is transmitted to another node or other nodes in accordance with the protocol above. This loop repeats until an edge node is reached by the cost message and the cost message cannot be forwarded in accordance with the protocol. At that point, step 408 is affirmatively answered and the method proceeds to step 414.

At step 414, the last link cost is added to the message. It is assumed that the link cost is added to the cost message by the receiving node; however, in an alternative embodiment, the sending node may add the link cost for the link that the node will use to transmit the cost message. At step 416, the message content is stored in memory. The content of the message is a series of link identifiers for each link traversed by the message, the cost of each link, and the gateway identifier for the gateway that sent the message. In one embodiment of the invention, this series forms a cost vector that defines the cost between the gateway and the node via a particular path. The vector may be processed into a scalar value or processed in a vector form. In another embodiment of the invention, the cost value is a scalar value that is updated with a weighted link cost value at each node. Thus, a single scalar value represents a path cost for the path through which the cost message propagated.

At step 418, the costs are compared to determine the lowest cost. At step 420, the lowest cost vector (or scalar) is selected and, at step 422, the path associated with the lowest cost is selected for transmission of data to be routed from the node to the gateway. The method ends at step 424.

Figure 5:
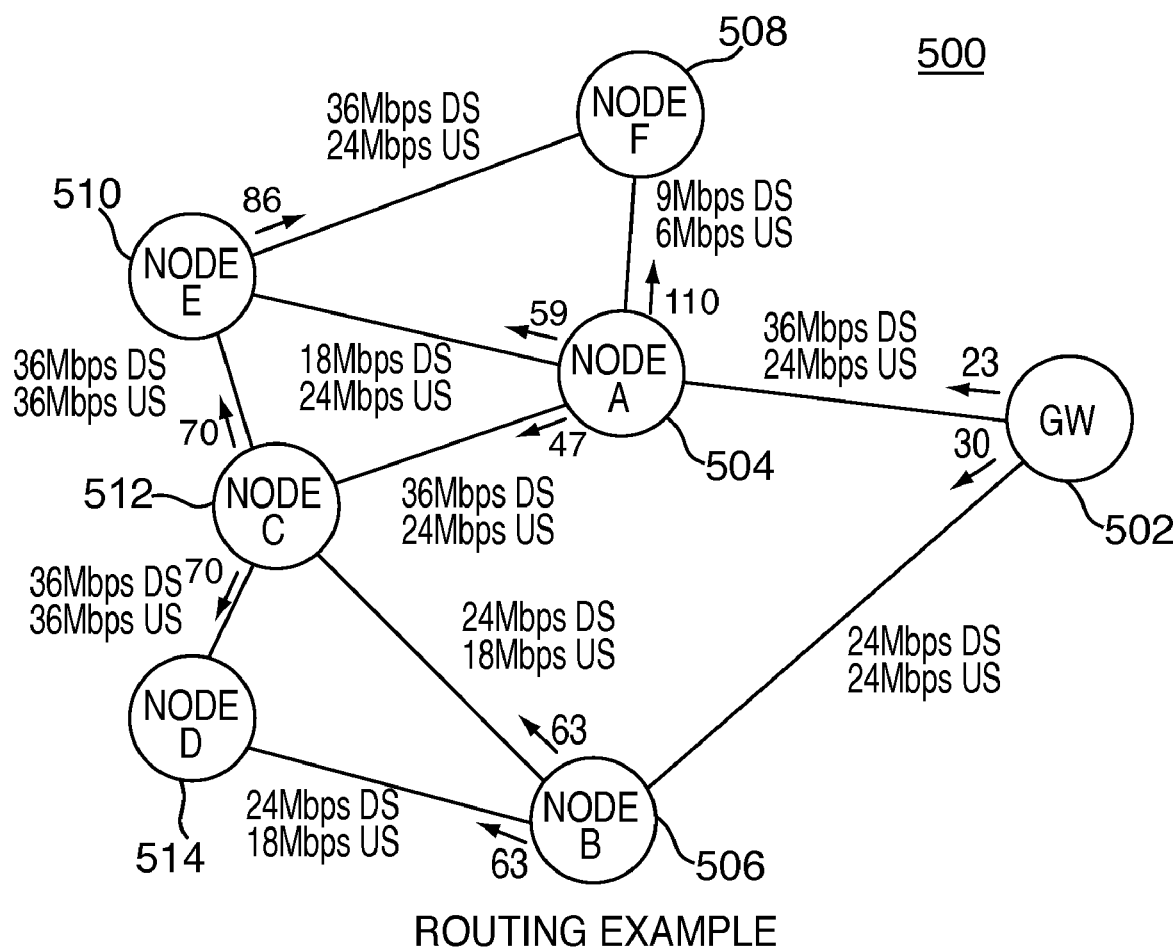
FIG. 5 graphically depicts routing costs associated with data paths on a mesh network in accordance with the present invention.

FIG. 5 is an example of calculating routing costs within a mesh network using a cost table. The mesh network 500 comprises a mesh gateway 502 connected to two nodes, Node A 504 and Node B 506. Node A 504 is connected to Node F 508, Node E 510, and Node C 512. Node B 506 is connected to Node C 512 and Node D 514. Node C 512 is connected to Node A 504, Node D 514, and Node E 510. Node D is connected to Node C 512 and Node B 506. Node E is connected to Node A 504, Node C 512 and Node F 508. Node F 508 is connected to Node A 504 and Node E 510. The data paths are bidirectional. A cost value associated with each data path is calculated using a cost table. In a typical mesh network, the links between nodes are asymmetrical (upstream and downstream modulation rates differ). By assigning differing cost value weights to the upstream and downstream links, this network attribute can be taken into consideration by the routing protocol to improve network capacity.

A mesh gateway 502 generates a routing cost value for each link modulation rate (both upstream and downstream) and places the values into a cost table. In one embodiment of the invention, the values in the table represent a weighted inverse relationship to modulation level with double the weight given to downstream capacity. These cost values differ from the cost values given to links between infrastructure nodes to other infrastructure nodes (e.g., a gateway or nodes located near the gateway), and from the cost value given to links between infrastructure nodes and subscriber nodes. Penalizing the lower modulation rate links by highly weighting those links causes the system to select the link with the greatest capacity. Table 1 represents one embodiment of a cost table for a mesh gateway.

TABLE 1

| | Raw Mod Rate | | | | | | | |
| --- | --- | --- | --- | --- | --- | --- | --- | --- |
| | 6 Mbps | 9 Mbps | 12 Mbps | 18 Mbps | 24 Mbps | 36 Mbps | 48 Mbps | 54 Mbps |
| Downstream | 85 | 56 | 41 | 27 | 20 | 13 | 9 | 8 |
| Upstream | 43 | 28 | 21 | 14 | 10 | 7 | 5 | 4 |

For example, a single mesh gateway with an overall aggregate capacity of 48 Mbps may have a 24 Mbps downstream link and 24 Mbps upstream link. The cost of a 24 Mbps downstream link is 20 and the cost of 24 Mbps upstream link is 10, for a total cost value of 30 along that data path.

A node selects the lowest cost route to a mesh gateway or another node based upon an incoming cost value and an outgoing cost value. The node computes the outgoing routing cost by favorably weighting the lowest incoming cost value and adding an outgoing cost value from a cost table. The cost table is predefined and loaded into a node during a setup process. In one example, the lowest incoming cost value is multiplied by 1.1 and then added to an outgoing cost value from a cost table. The algorithm is as follows:

$$Outgoing\_cost = (lowest\_incoming\_cost \times 1.1) + outgoing\_link\_cost$$

Table 2 represents one embodiment of a cost table for another node.

TABLE 2

| | Raw Mod Rate | | | | | | |
|---|---|---|---|---|---|---|---|
| | 6 Mbps | 9 Mbps | 12 Mbps | 18 Mbps | 24 Mbps | 36 Mbps | 48 Mbps | 54 Mbps |
| Downstream | 72 | 48 | 36 | 24 | 18 | 12 | 9 | 8 |
| Upstream | 36 | 24 | 18 | 12 | 9 | 6 | 5 | 4 |

As each node is added to the network, the invention determines the route selection based upon the cost calculation. Node A 504 is connected to a mesh gateway 502 by a 36 Mbps downlink and a 24 Mbps uplink. A routing cost of 23 is computed from the cost table (Table 1) for a mesh gateway by adding a value of 13 for the 36 Mbps downlink and a value of 10 for the 24 Mbps uplink. Node A 504 is connected to Node C 512, Node E 510, and Node F 508. The routing cost between Node A 504 and the connected nodes is computed by favorably weighting the lowest incoming cost value into Node A 504 and adding an outgoing cost value from a cost table. The incoming cost value into Node A 504 from the mesh gateway 502 is 23, and the data link between Node A 504 and Node F 508 has a 9 Mbps downstream link and a 6 Mbps upstream link. The outgoing cost is computed by multiplying the lowest incoming cost into Node A 504 by 1.1 and then adding the value from the cost table (Table 2) for the outgoing link. A downstream link of 9 Mbps has a cost value of 48 and a 6 Mbps upstream link has a value of 36. The cost values for the downstream and upstream link are summed together for an aggregate value of 84. The path between Node A 504 and Node F 508 has a routing cost value of 110, which is calculated from the equation (1.1×23)+(48+36)=110. Similarly, the routing cost values between Node A 504 and Node E 510 and between Node A 504 and Node C 512 can be calculated. Node A 504 will then select the data path with the lowest routing cost value.

In another embodiment, the routing path may be computed as a vector. For example, the path from the gateway 502 to Node A 504 to Node C 512 to Node D 514 has a vector of $V_1$=23, 47, 70 and a magnitude of 96.9, while the path from the gateway 502 to Node B 506 to Node C 512 to Node D 514 has a vector of $V_2$=30, 67, 70 and a magnitude of 98.8. Based upon the vector magnitudes, the path gateway 502 to Node A 504 to Node C 512 to Node D 514 would be selected for its minimum cost and maximum data carrying capacity. In another embodiment, a path may be selected by selecting the link with the lowest cost of each node, i.e., selecting a path of least resistance from a node to the gateway.

In another embodiment of the invention, the routing cost may be calculated based upon a nodes proximity to a bandwidth constrained node such as a mesh gateway. Data paths associated with nodes that have a greater proximity to the mesh gateway than other nodes are given a greater weighting in calculating the routing cost. This disfavors the selection of nodes closer to the mesh gateway when selecting a routing path through the mesh network. By weighting the cost values in this manner, traffic can be routed away from the gateway (or other bandwidth constrained node) to reduce the likelihood of a bottleneck occurring.

In another embodiment of the invention, the routing cost may be calculated based upon the class of service required by the data being transmitted. Certain classes of traffic can be given priority over other classes of traffic to expedite transmission through the mesh gateway. For example, latency sensitive traffic such as voice data, may be given priority over regular traffic through the mesh gateway.

The forgoing embodiments used a proactive technique, where a cost message is routinely transmitted through the network to gather path cost information. In another embodiment of the invention, the nodes may request cost information from their neighboring nodes. The response to such queries can be used to update the cost tables within the nodes.

While the foregoing is directed to embodiments of the present invention, other and further embodiments of the invention may be devised without departing from the basic scope thereof, and the scope thereof is determined by the claims that follow.

The invention claimed is:

1. A method for maximizing data transmission capacity of a mesh network performed by a computer executing cost analysis software, wherein the mesh network comprises first and second data paths, and wherein the first and second data path comprise first and second pluralities of links, respectively; the method comprising:

the computer calculating the first routing cost for the first data path as a function of at least one first link cost that is weighted as a function of a first proximity of a first link of the first plurality of links to a first element of the mesh network;

the computer calculating the second routing cost for the second data path as a function of at least one second link costs that is weighted as a function of a second proximity of a second link of the second plurality of links to the first element or to a second element of the mesh network;

the computer selecting the first data path when the first routing cost is less than the second routing cost;

the computer selecting the second data path when the second routing cost is less than the first routing cost; and the computer selecting either the first routing path or the second routing path when the first and second routing costs are equal; and Wherein the at least one first link cost is less than the at least one second link cost when the second proximity is less than the first proximity, and wherein the at least one second link cost is less than the at least one first link cost when the first proximity is less than the second proximity.

2. The method of claim 1 wherein the at least one first link cost is weighted as a function of the first proximity and a first link capacity of the first link, and wherein the at least one second link cost is weighted as a function of the second proximity and a second link capacity of the second link.

3. The method of claim 1 wherein calculating the first and second routing costs comprises calculating the first and second routing costs as scalars.

4. The method of claim 1 wherein calculating the first and second routing costs comprises calculating the first and second routing costs as vectors.

5. The method of claim 1 wherein each of the first and second elements is any of a given node and given link of the mesh network that is bandwidth constrained.

6. The method of claim 1 wherein the given node is a gateway.

7. The method of claim 1 wherein:
the first link cost is weighted using a first weight when the first link is disposed upstream from a first node of the mesh network;
the first link cost is weighted using a second weight when the first link is disposed downstream from the first node;
the second link cost is weighted using a third weight when the second link is disposed upstream from the first node or from a second node of the mesh network; and
the second link cost is weighted using a fourth weight when the second link is disposed downstream from the first node or from the second.

8. The method of claim 7 wherein: the second weight is double the first weight, and wherein the fourth weight is double the third weight.

9. The method of claim 1 wherein:
the at least one first link cost is weighted as a function of a class of service in lieu of or in addition to the first proximity; and
the at least one second link cost is weighted as a function of a class of service in lieu of or in addition to the second proximity.

10. A method of maximizing data transmission capacity within a mesh network, wherein the mesh network comprises first and second data paths, and wherein the first and second data path comprise first and second pluralities of links, respectively; the method comprising:
transmitting a first cost message through the mesh network via the first data path;
adding, for the first plurality of links traversed by the first cost message, a respective first plurality of link costs to a first routing cost contained in the first cost message, wherein at least one first link cost of the first plurality of link costs is weighted as a function of a first proximity of a first link of the first plurality of links to a first element of the mesh network;
transmitting a second cost message through the mesh network via the second data path;
adding, for the second plurality of links traversed by the second cost message, a respective second plurality of link costs to a second routing cost contained in the second cost message, wherein at least one second link cost of the second plurality link costs is weighted as a function of a second proximity of a second link of the second plurality of links to the first element or to a second element of the mesh network;
routing information over the first data path when the first routing cost is optimal; and
routing the information over the second data path when the second routing cost is optimal; and
Wherein the at least one first link cost is less than the at least one second link cost when the second proximity is less than the first proximity, and wherein the at least one second link cost is less than the at least one first link cost when the first proximity is less than the second proximity.

11. The method of claim 10 further comprising:
determining that the first routing cost is optimal when the first routing cost is less than the second routing cost; and
determining that the second routing cost is optimal when the second routing cost is less than the first routing cost.

12. The apparatus of claim 10 wherein each of the first and second elements is any of a given node and given link of the mesh network that is bandwidth constrained.

13. The method of claim 10 wherein the given node is a gateway.

14. The method of claim 10 wherein:
the first link cost is weighted using a first weight when the first link is disposed upstream from a first node of the mesh network;
the first link cost is weighted using a second weight when the first link is disposed downstream from the first node;
the second link cost is weighted using a third weight when the second link is disposed upstream from the first node or from a second node of the mesh network; and
the second link cost is weighted using a fourth weight when the second link is disposed downstream from the first node or from the second node.

15. The method of claim 14 wherein: the second weight is double the first weight, and wherein the fourth weight is double the third weight.

16. The method of claim 10 wherein:
the at least one first link cost is weighted as a function of a class of service in lieu of or in addition to the first proximity; and
the at least one second link cost is weighted as a function of a class of service in lieu of or in addition to the second proximity.

17. An apparatus for maximizing the data transmission capacity of a mesh network, wherein the mesh network comprises first and second data paths, and wherein the first and second data path comprise first and second pluralities of links, respectively; the apparatus comprising: a mesh gateway and a plurality of nodes coupled to one another and to the mesh gateway via the first and second pluralities of links, wherein:
the mesh gateway is operable to:
originate towards a destination node, via the first data path, a first cost message containing a first routing cost; and
originate towards the destination node, via the second data path, a second cost message containing a second routing cost; and
the plurality of nodes are operable to:
add, for the first plurality of links traversed by the first cost message, a respective first plurality of link costs to the first cost message, wherein at least one first link cost of the first plurality link costs is weighted as a function of a first proximity of a first link of the first plurality of links to a first element of the mesh network; and
add, for the second plurality of links traversed by the second cost message, a respective second plurality of link costs to the second cost message, wherein at least one second link cost of the second plurality link costs is weighted as a function of a second proximity of a second link of the second plurality of links to the first element or to a second element of the mesh network; and
any of the mesh gateway and plurality of nodes are operable to:
routing information over the first data path when the first routing cost is optimal; and routing the information over the second data path when the second routing cost is optimal; and Wherein the at least one first link cost is less than the at least one second link cost when the second proximity is less than the first proximity, and wherein the at least one second link cost is less than the at least one first link cost when the first proximity is less than the second proximity.

18. The apparatus of claim 17, wherein:

the first link cost is weighted using a first weight when the first link is disposed upstream from a first node of the mesh network;

the first link cost is weighted using a second weight when the first link is disposed downstream from the first node;

the second link cost is weighted using a third weight when the second link is disposed upstream from the first node or from a second node of the mesh network;

the second link cost is weighted using a fourth weight when the second link is disposed downstream from the first node or from the second node;

the first weight is less than he second weight; and the third weight is less than the fourth weight.

19. The apparatus of claim 17 wherein each of the first and second elements is any of a given node and given link of the mesh network that is bandwidth constrained.

20. The apparatus of claim 19 wherein the given node is the mesh gateway.

* * * * *